Aug. 15, 1961  L. R. GRABOWSKI  2,995,947
BALL BEARING SCREW AND NUT ASSEMBLY
Filed June 27, 1960
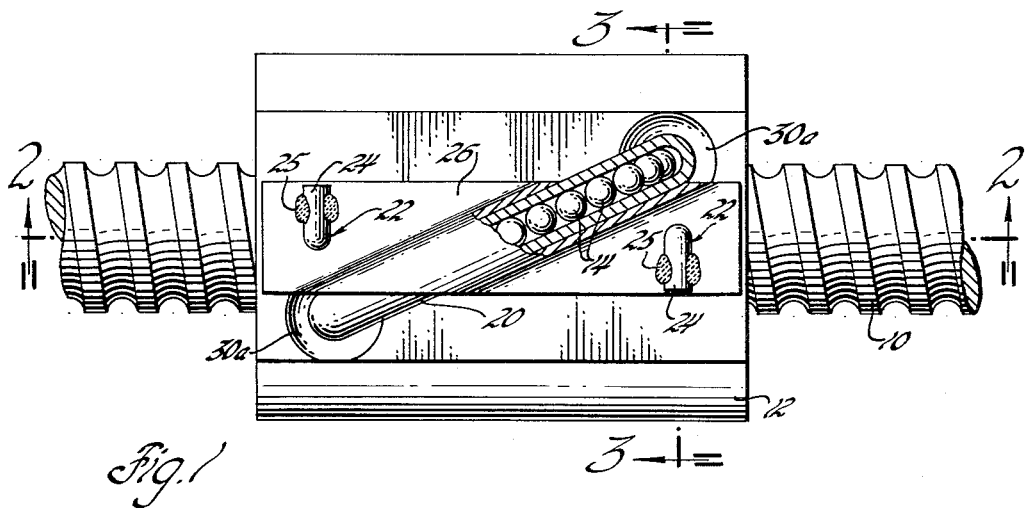
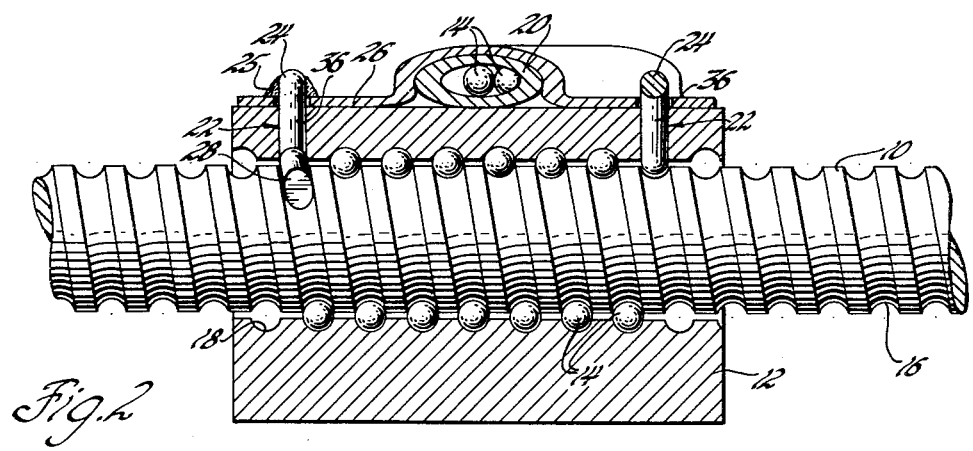
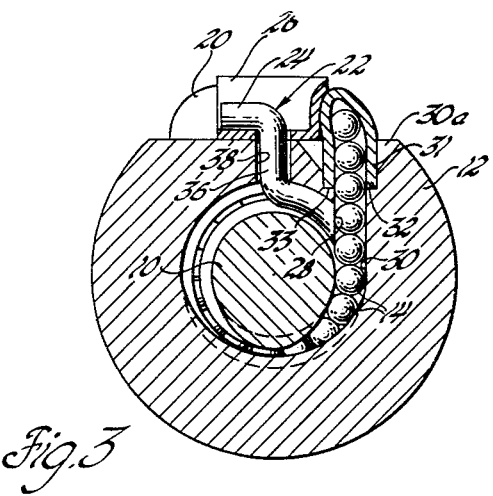
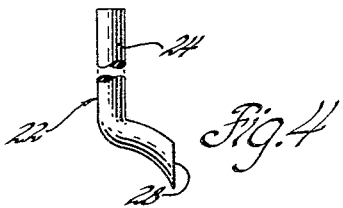
INVENTOR.
Leonard R. Grabowski
BY
Bryce Beecher
ATTORNEY United States Patent Office 2,995,947
Patented Aug. 15, 1961

2,995,947
BALL BEARING SCREW AND NUT ASSEMBLY
Leonard R. Grabowski, Bay City, Mich., assignor to General Motors Corporation, Detroit, Mich., a corporation of Delaware
Filed June 27, 1960, Ser. No. 38,882
5 Claims. (Cl. 74—459)

This invention relates to an improvement in screw and nut devices of the type in which the screw and nut are correspondingly threaded to provide a helical ball passage made endless by a return tube extending across the body of the nut.

The invention has in contemplation extremely small ball nut and screw assemblies possessed of unusually high efficiency and accuracy. Thus, in accordance therewith, a miniature, light-weight assembly with only 3/16" ball circle diameter having upwards of 90% efficiency has been produced and found capable of positioning mechanical components within .0005" for each inch of lineal travel of the ball nut or screw.

The invention opens up very interesting possibilities in the areas of electronic controls, radar tuners, missile and rocket guidance and telemetering systems, automatic switching devices and many other engineering applications where critical positioning problems are encountered along with stringent space and weight limitations.

The principal objects of the invention being implicit in the foregoing, the same will now be described in terms of a preferred embodiment thereof illustrated by the accompanying drawings wherein:

FIGURE 1 is an assembly view with certain parts shown broken away or in section;
FIGURE 2 is a section on the line 2—2 in FIGURE 1;
FIGURE 3 is a section on the line 3—3 in FIGURE 1; and
FIGURE 4 illustrates the ball deflector elements employed in the device as the same appear before assembly of the device.

In FIGURES 1–3, the numerals 10 and 12 respectively denote the screw and nut components of the assembly which also comprises balls 14 whereby the screw and nut are interconnected. The balls 14 are confined in part in the race provided by the matching helical grooves 16 and 18 of the screw and nut and in part in the return or transfer tube 20.

As well understood in the art, when one of the screw and nut is held against axial movement and is rotated relative to the other, the other part will be caused to move lineally if restrained against rotary movement. The described action proceeds with travel of the balls through the circuit consisting of the helical race and the return tube.

To facilitate movement of the balls 14 into and out of the transfer tube 20, there is provided a pair of wire elements 22 having portions 24 shown soldered (25) to the clamp or saddle 26 whereby the return tube 20 is secured to the nut. These wire elements 22 constitute a particular feature of the invention in that they make possible the miniaturization of the unit.

It is essential that the elements 22 be fixed in the groove 18 of the nut and it has been found that this is most expediously achieved by hydrogen brazing. The deflector end 28 of each of the wire elements is shaped following fixing of the element in the nut, the shaping being accomplished by means of a tool inserted through the orifice 30 in the nut. Such orifice, which in the completed assembly accommodates a depending end 31 of the return tube 20, is flared (30a) to facilitate the introduction of the tool. It will be observed that the orifice is provided with an annular shoulder 32 seating the tip 33 of the portion 31 of the return tube. This shoulder has a width matching the gauge of the metal of which the return tube is formed, any interference with ball travel in this area being thus precluded.

The bending-over of the portions 24 (FIG. 4) of the deflector elements and the shouldering thereof to the clamp 26 constitutes the final step of the assembly operation before loading of the balls. The neck portions 36 of the deflectors need not be brazed or otherwise fixed to the walls of the orifices 38 through which such portions extend.

The importance of fixing the deflector elements in the groove of the nut cannot be over-emphasized. Thus, using resilient wire members which are sprung into place, it is found in the case of miniature designs, where there may be a clearance of only .006" in excess of the ball diameter within the recirculating system, mis-matches between the deflector end and the ball passage are prone to occur with interference in the circulation of the balls. No such mis-match can happen with the deflector fixed in the nut and particularly when the deflector end is shaped as above described, that is, with the deflector already located and secured.

I claim:
1. In a ball nut and screw device of the type including a transfer tube fastened to the nut by clamp means and having an end which through a passage in the nut opens to the helical ball race formed by the groove of the screw and the complementary groove formed internally in the nut, a wire element having an arcuate portion, a neck portion and a head portion, said arcuate portion being firmly bonded to the nut in the helical groove thereof, one end of such arcuate portion being located at the point of opening of said passage to said race and being shaped so as to serve as a deflector with respect to the balls entering and leaving said transfer tube, said neck portion extending through an aperture in said nut, said head portion being disposed externally of the nut and being bonded to said clamp means to secure the same to the nut.

2. In a ball nut and screw device of the type including a transfer tube fastened to the nut by clamp means and having an end which through a passage in the nut opens to the helical ball race formed by the groove of the screw and the complementary groove formed internally of the nut, a wire element having an arcuate portion, a neck portion and a head portion, said arcuate portion being brazed to the nut in the helical groove thereof, one end of such arcuate portion being located at the point of opening of said passage to said race and being shaped so as to serve as a deflector with respect to the balls entering and leaving said transfer tube, said neck portion extending through an aperture in said nut, said head portion being disposed externally of the nut and being soldered to said clamp means to secure the same to the nut.

3. In a ball nut and screw device of the type including a transfer tube fastened to the nut by clamp means and having an end which through a passage in the nut opens to the helical ball race formed by the groove of the screw and the complementary groove formed internally of the nut, a wire element having an arcuate portion, a neck portion and a head portion, said arcuate portion being firmly bonded to the nut in the helical groove thereof, one end of such arcuate portion being located at the point of opening of said passage to said race and being shaped so as to serve as a deflector with respect to the balls entering and leaving said transfer tube, said neck portion extending through an aperture in said nut, said head portion being disposed externally of the nut and being bent over and bonded to said clamp means to secure the same to the nut.

4. In a ball nut and screw device of the type including a transfer tube fastened to the nut by clamp means, the ends of said transfer tube being received in counterbores in said nut and opening to passages in the nut extending to the helical ball race formed by the groove of the screw and the complementary groove formed internally of the nut, a pair of wire elements each having an arcuate portion, a neck portion and a head portion, said arcuate portions being firmly bonded to the nut in the helical groove of the nut, the ends thereof furthest removed from said head portions being located at the points of opening of said passages to said race and being shaped so as to serve as deflectors with respect to the balls entering and leaving said transfer tube, said neck portions extending through apertures in said nut, said head portions being disposed externally of the nut and being bonded to said clamp means to secure the same to the nut.

5. A device conforming to claim 4 in which said arcuate portions are secured in the helical groove of the nut by brazing and in which said head portions are bent over and soldered to said clamp means.

References Cited in the file of this patent

UNITED STATES PATENTS

| | | |
|---|---|---|
| 2,505,131 | Means | Apr. 25, 1950 |
| 2,508,261 | Hosler | May 16, 1950 |
| 2,636,397 | Jacubenta | Apr. 28, 1953 |
| 2,783,656 | Fisher | Mar. 5, 1957 |
| 2,836,075 | Galonska | May 27, 1958 |